United States Patent
Patwardhan et al.

(10) Patent No.: US 10,708,266 B2
(45) Date of Patent: Jul. 7, 2020

(54) WIRELESS NETWORK DEVICE FINGERPRINTING AND IDENTIFICATION USING PACKET RECEPTION SUCCESS PROBABILITIES

(71) Applicant: Hewlett Packard Enterprise Development LP, Houston, TX (US)

(72) Inventors: Gaurav Patwardhan, Santa Clara, CA (US); Sachin Ganu, San Jose, CA (US); Jose Tellado, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 16/108,304

(22) Filed: Aug. 22, 2018

(65) Prior Publication Data
US 2020/0067919 A1  Feb. 27, 2020

(51) Int. Cl.
*H04L 12/26* (2006.01)
*H04L 29/06* (2006.01)
(Continued)

(52) U.S. Cl.
CPC ........ *H04L 63/0876* (2013.01); *H04L 1/0003* (2013.01); *H04L 12/2803* (2013.01);
(Continued)

(58) Field of Classification Search
CPC . H04L 1/0003; H04L 1/1642; H04L 43/0894; H04L 43/045; H04L 43/0811; H04L 43/0817; H04L 43/0829; H04L 63/0876; H04L 63/0892; H04L 63/10; H04L 12/2803; H04L 43/034;
(Continued)

(56) References Cited

U.S. PATENT DOCUMENTS

| 9,225,732 B2 | 12/2015 | Beyah et al. | |
| 2002/0042256 A1* | 4/2002 | Baldwin | ................ H03D 3/008 455/232.1 |

(Continued)

OTHER PUBLICATIONS

K N Gopinath, "An Empirical Analysis of Heterogeneity in IEEE 802.11 MAC Protocol Implementations and Implications", CSA Department, IISc, India, Sep. 29, 2006, 8 pages.

*Primary Examiner* — Le H Luu
(74) *Attorney, Agent, or Firm* — Sheppard Mullin Richter & Hampton LLP

(57) ABSTRACT

Systems and methods are disclosed for generating a client device fingerprint model and identifying client devices using the model. Identifying client devices includes monitoring traffic transmitted over a wireless network to an unknown first client device, the traffic using at least one value of at least one wireless network operational parameter; determining, for each at least one value of the at least one wireless network operational parameter, a respective probability of successful packet reception at the first client device; comparing each probability to a data model representing probabilities of successful packet reception at each of a plurality of known second client devices for each of a plurality of values of the wireless network operational parameter; and associating at least one of the labels of the second client devices with the first client device based on the compare.

20 Claims, 12 Drawing Sheets

(51) Int. Cl.
*H04L 1/00* (2006.01)
*H04L 12/28* (2006.01)
(52) U.S. Cl.
CPC ........ *H04L 43/045* (2013.01); *H04L 43/0811* (2013.01); *H04L 43/0894* (2013.01); *H04L 63/0892* (2013.01)
(58) Field of Classification Search
CPC .... H04L 47/30; G05B 23/0297; H03D 3/008; H04B 1/3805; H04J 11/0023; H04W 28/18; H04W 48/12
See application file for complete search history.

(56) References Cited

U.S. PATENT DOCUMENTS

| | | | |
|---|---|---|---|
| 2003/0112824 A1* | 6/2003 | Acosta | H04L 1/1642 370/474 |
| 2008/0056201 A1* | 3/2008 | Bennett | H04W 28/18 370/334 |
| 2009/0168800 A1* | 7/2009 | Leinonen | H04B 1/3805 370/464 |
| 2010/0118830 A1* | 5/2010 | Stephenson | H04L 63/10 370/331 |
| 2011/0096694 A1* | 4/2011 | Jiang | H04L 43/0817 370/253 |
| 2013/0170360 A1* | 7/2013 | Xu | H04J 11/0023 370/241 |
| 2014/0226476 A1* | 8/2014 | Bertze | H04L 47/30 370/230.1 |
| 2014/0293856 A1* | 10/2014 | Kasslin | H04W 48/12 370/311 |
| 2017/0222976 A1 | 8/2017 | Gross et al. | |
| 2017/0347279 A1* | 11/2017 | Bejerano | H04L 43/0829 |
| 2018/0284752 A1* | 10/2018 | Cella | G05B 23/0297 |

\* cited by examiner

WIRELESS NETWORK DEVICE FINGERPRINTING AND IDENTIFICATION USING PACKET RECEPTION SUCCESS PROBABILITIES

DESCRIPTION OF RELATED ART

People increasingly rely upon computer networks and network client devices to perform tasks that require a high level of network security, for example including access to buildings, bank accounts, and the like. And miscreants employ increasingly sophisticated attacks in their attempts to penetrate those networks. One type of attack is referred to as "spoofing," where the attacker employs a network device that mimics a device having access to a secure network. It is therefore essential to identify network client devices reliably in order to safeguard those networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
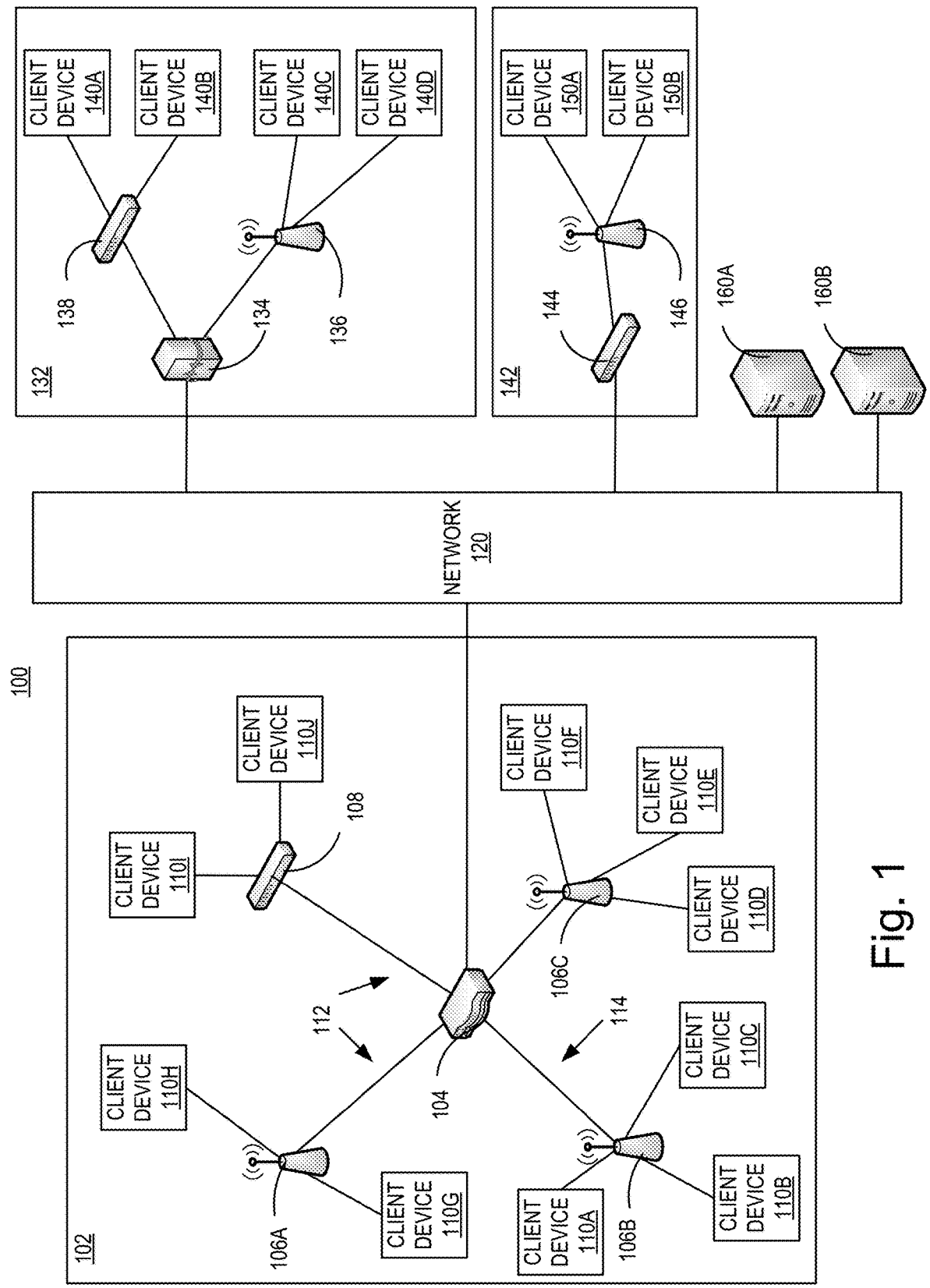
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Previous anti-spoofing solutions identify wireless client devices by creating models using percentage distributions of rates used by the client devices to send data upstream to access points under ideal conditions. This approach has at least two limitations. One, if the data flow is primarily downstream, the models will fail because they do not describe the downlink stream. Two, under non-ideal network conditions such as low signal-to-noise ratios (SNRs) or low received signal strength indications (RSSIs), the models may fail for not describing non-ideal link conditions.

Implementations of the disclosed technology may include systems and methods that employ fingerprint models describing probabilities of successful packet reception at known client devices for different values of wireless network operational parameters. As used herein, the term "wireless network operational parameter" describes a multivariate parameter used to generate the wireless signal representing the packet. Example wireless network operational parameters include the modulation scheme employed, the coding scheme employed, the modulation and coding scheme employed (MCS, being a unique combination of a particular modulation scheme and a particular coding scheme), the number of spatial streams employed, the guard interval employed, the bandwidth of the signal, the low density parity check coding scheme employed, the space-time block coding scheme employed, and the like. Observed success probabilities for an unknown client device are compared to those in the fingerprint model to identify or label the client device, for example by make, model, and software version. The observations may be carried out on downlink only, and under adverse network conditions.

In this description, a client device is "known" when values of operational network parameters that identify the client device are associated with the client device in the disclosed fingerprint models. Known client devices are employed to create and modify the fingerprint models described herein. Conversely, a client device is "unknown" when these values are not known. The disclosed fingerprint models are used to identify unknown client devices by observing their values and comparing the observed values with the values in the fingerprint models.

Implementations of the disclosed technology features several advantages. With the disclosed embodiments, spoofing authorized client devices in order to gain access to a secure wireless network becomes extremely difficult. While it is fairly easy to spoof the MAC address of an authorized device, the disclosed embodiments identify the client devices using characteristics that are built deep in the hardware and driver software of the device, and so are extremely difficult to change. These characteristics include rate adaptation, placement and design of the antennas, and characteristics of the wireless signals employed by the devices such as modulation scheme, coding scheme, number of spatial streams, long and short guard intervals, bandwidth, low density parity check coding scheme, space-time block coding scheme, and the like.

These characteristics and behaviors are observed and, along with probabilities of successful packet reception at the client device, are used to identify the device by make, model, operating system, and the like. This information, alone or in combination with information collected by conventional approaches, may be used to identify an unauthorized device being used to spoof a client device that is authorized to access the wireless network, and to take action to secure the network, for example by denying network access to the spoofing client device.

Implementations of the disclosed technology can be built with existing hardware and software. These implementations have very high direct commercial advantage because they add additional dimensions and features to existing device fingerprinting and identification techniques, and because there is extremely high demand for improved device fingerprinting and identification solutions in the current security-conscious networking industry.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110a-j may connect to the switch 108 and through the switch 108, may be able to access other devices within the network configuration 100. The client devices 110a-j may also be able to access the network 120, through the switch 108. The client devices 110a-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Figure 2:
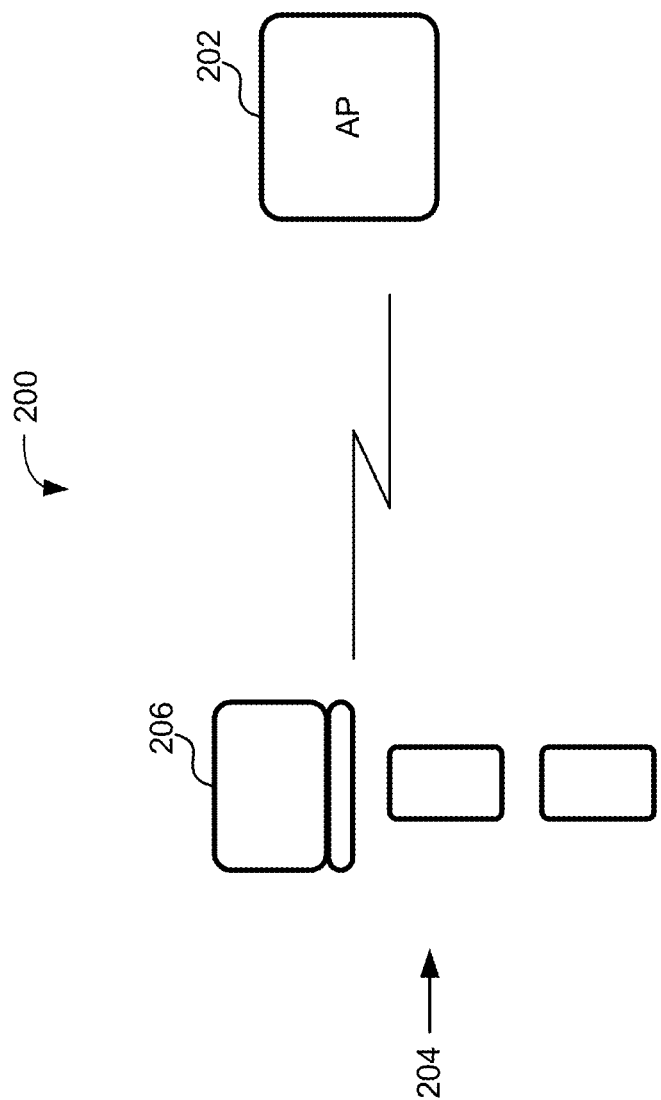
FIG. 2 depicts two experiments conducted by the inventors to prove the disclosed technologies.

The inventors have shown through experimentation that the disclosed technologies may be used to reliably fingerprint client devices in a novel manner. FIG. 2 depicts a wireless communications system 200 for experiments conducted by the inventors to demonstrate the disclosed technologies. In a first experiment, the inventors placed several known smartphones 204 and a monitoring device 206, also referred to as a "wireless sniffer," approximately 60 feet distant from an access point 202. The access point 202 then streamed a 20-minute video to the smartphones 204 while the wireless sniffer 206 monitored the network conditions and behavior of each of the smartphones 204. The system of FIG. 2 may also be deployed to create client device fingerprint models using known client devices 204, to identify unknown client devices 204, or both, according to embodiments disclosed herein.

Figure 3:
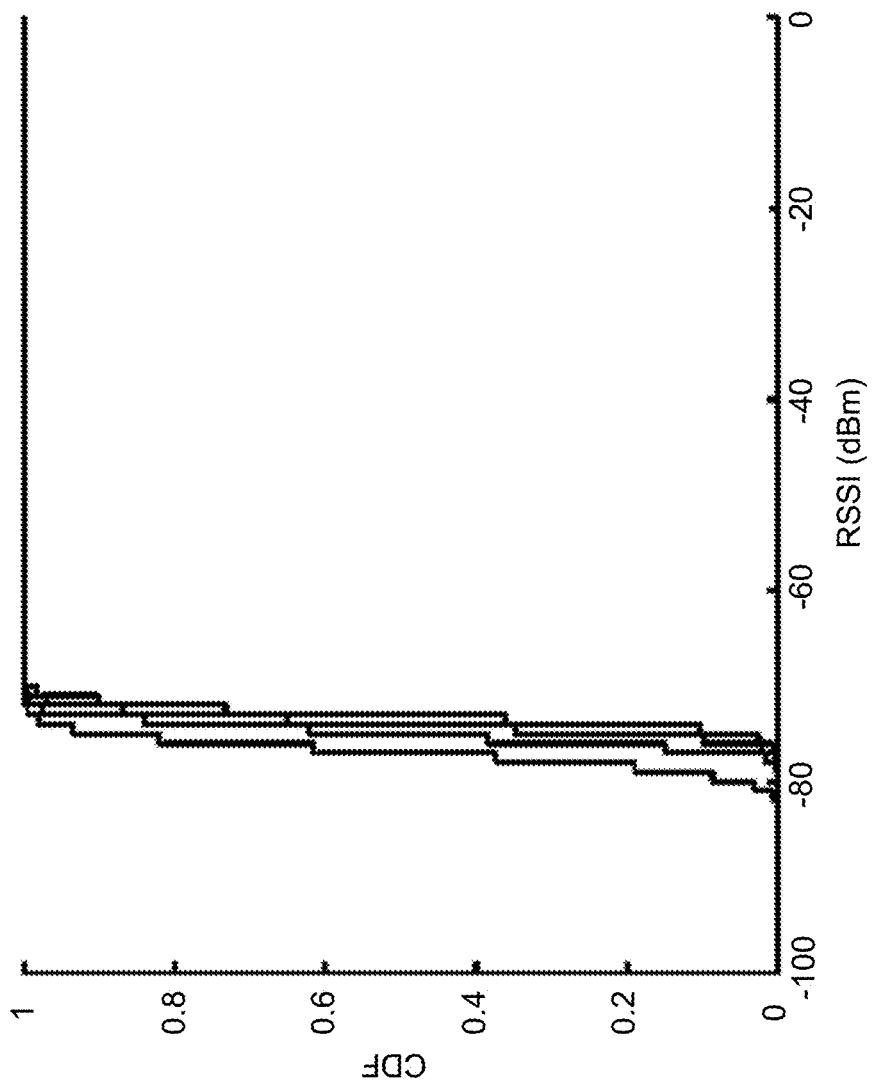
FIG. 3 is a cumulative distribution function (CDF) plot of RSSI for four smartphones at a distance of 60 feet from the access point.

FIG. 3 is a cumulative distribution function (CDF) plot of RSSI for four smartphones 204, including two models of iPhone7, one iPhone6, and one Samsung Galaxy S7. From FIG. 3 it is clear that all of the smartphones 204 are operating under similar network conditions, with RSSI within a similar range with (+/−3-5 dBm) for all four smartphones 204.

Figure 4:
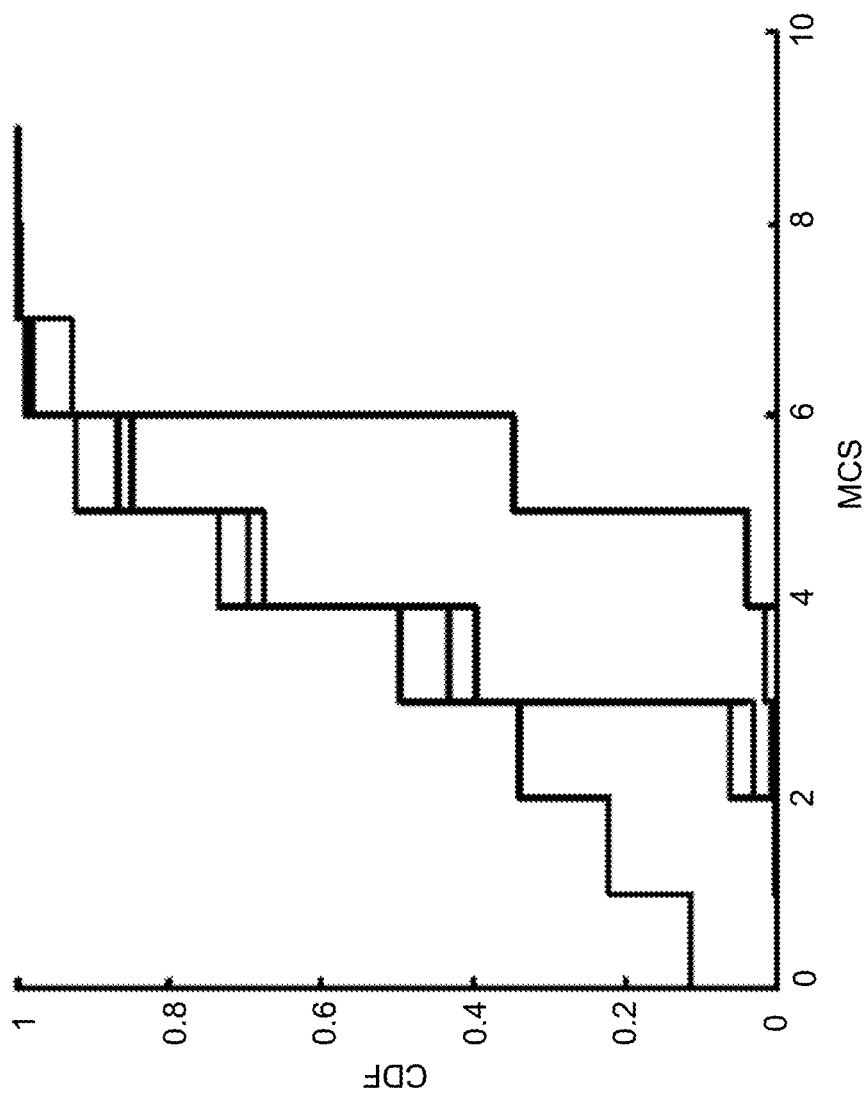
FIG. 4 is a CDF plot of MCS adaptation for the same four smartphones.
Figure 5:
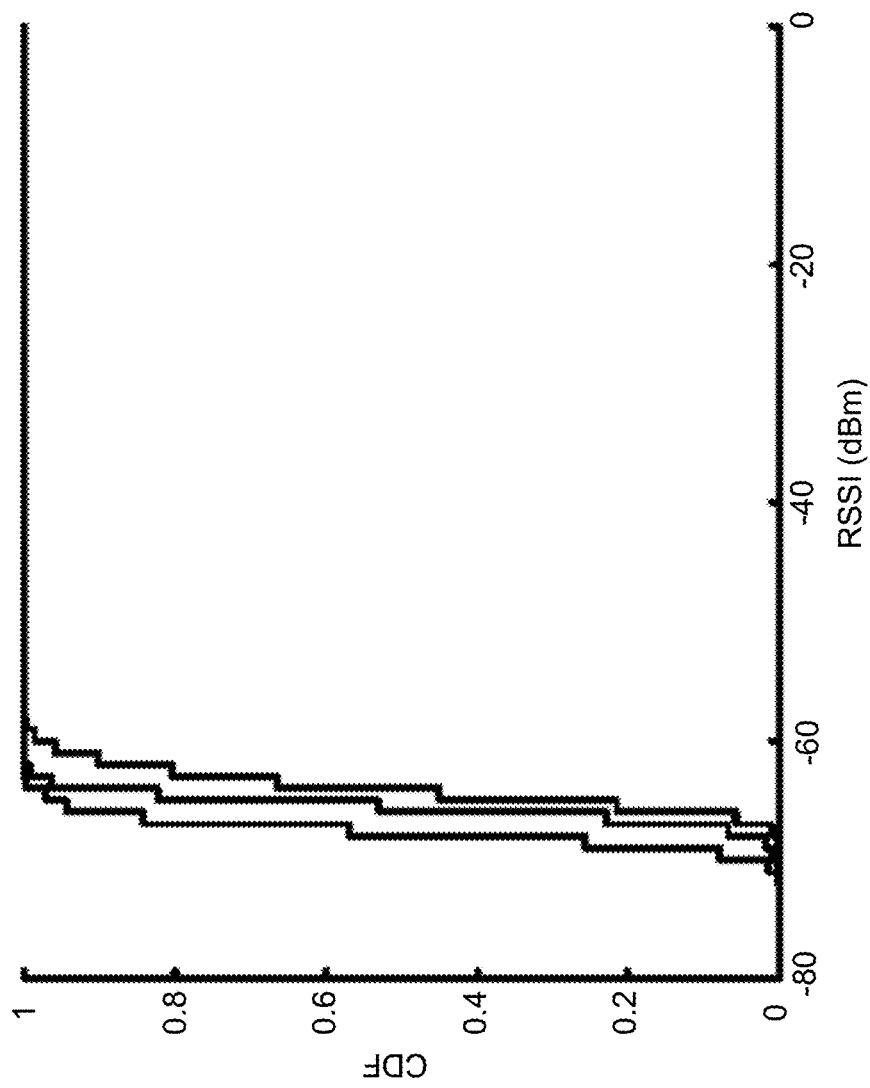
FIG. 5 is a CDF plot of RSSI at a distance of 30 feet from the access point.
Figure 6:
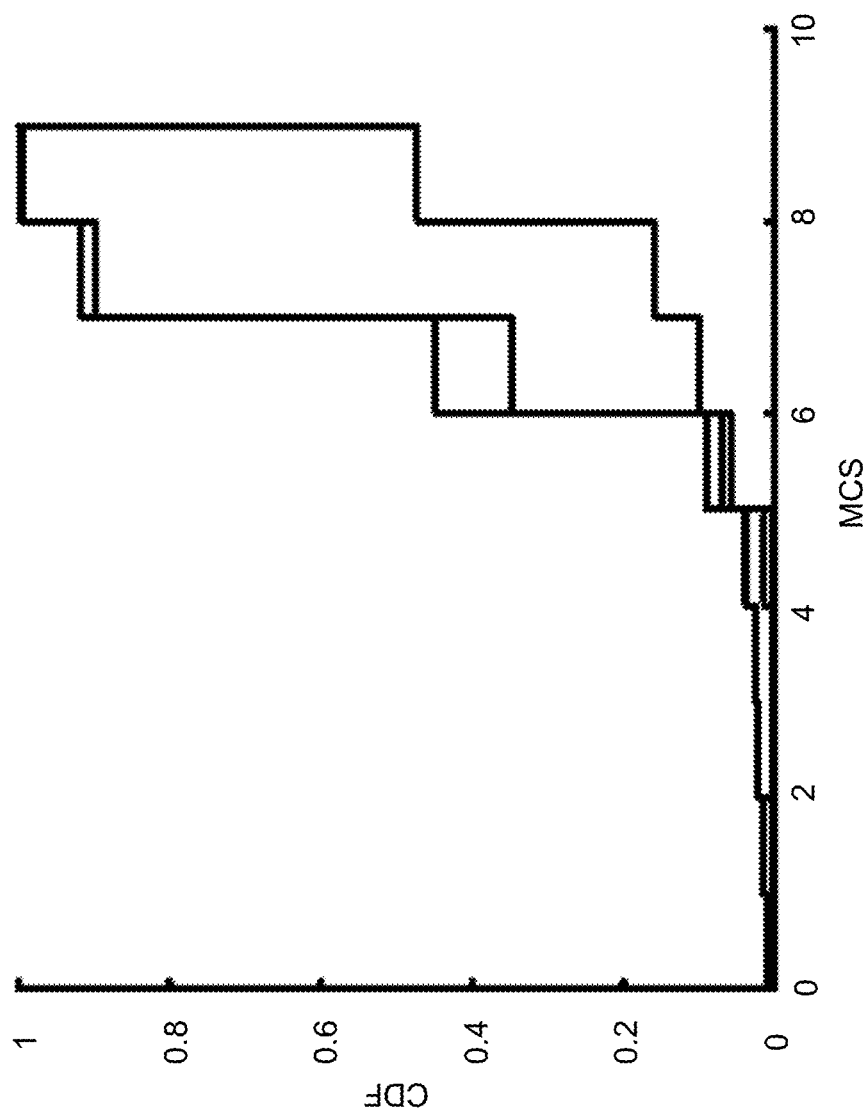
FIG. 6 is a CDF plot of MCS adaptation at a distance of 30 feet from the access point.

FIG. 4 is a CDF plot of MCS adaptation for the same four smartphones 204. While one might expect the smartphones 204 to exhibit similar MCS adaptation behavior due to similar traffic and network conditions, it is clear from FIG. 4 that this is not the case. The inventors have found similar results for multiple other variables such as number of spatial streams (SS), short and long symbol guard intervals (SGI and LGI), and the like. The experiment was repeated at a distance of 30 feet, with similar results. FIG. 5 is a CDF plot of RSSI at 30 feet. FIG. 6 is a CDF plot of MCS adaptation at 30 feet.

From these experiments it is clear that, under similar network conditions, the adaptation behavior used for downlink packets are different for every type of client device and are similar for the same type client devices. In addition, for the same type of client device the adaptation behavior differs when the network conditions change. For this reason device behavior is measured on the downlink, near the client device.

Two primary approaches may be employed for creating a model representing device fingerprints using the disclosed techniques. One approach is to use support vector machines or principle component analysis for clustering and creating an unsupervised model which does not require labelled data. Another way is to create labelled data by using existing device fingerprinting methods to help decrease false positives and false negatives while detecting the device type. A hybrid approach using both of these techniques can be used as well.

Figure 7:
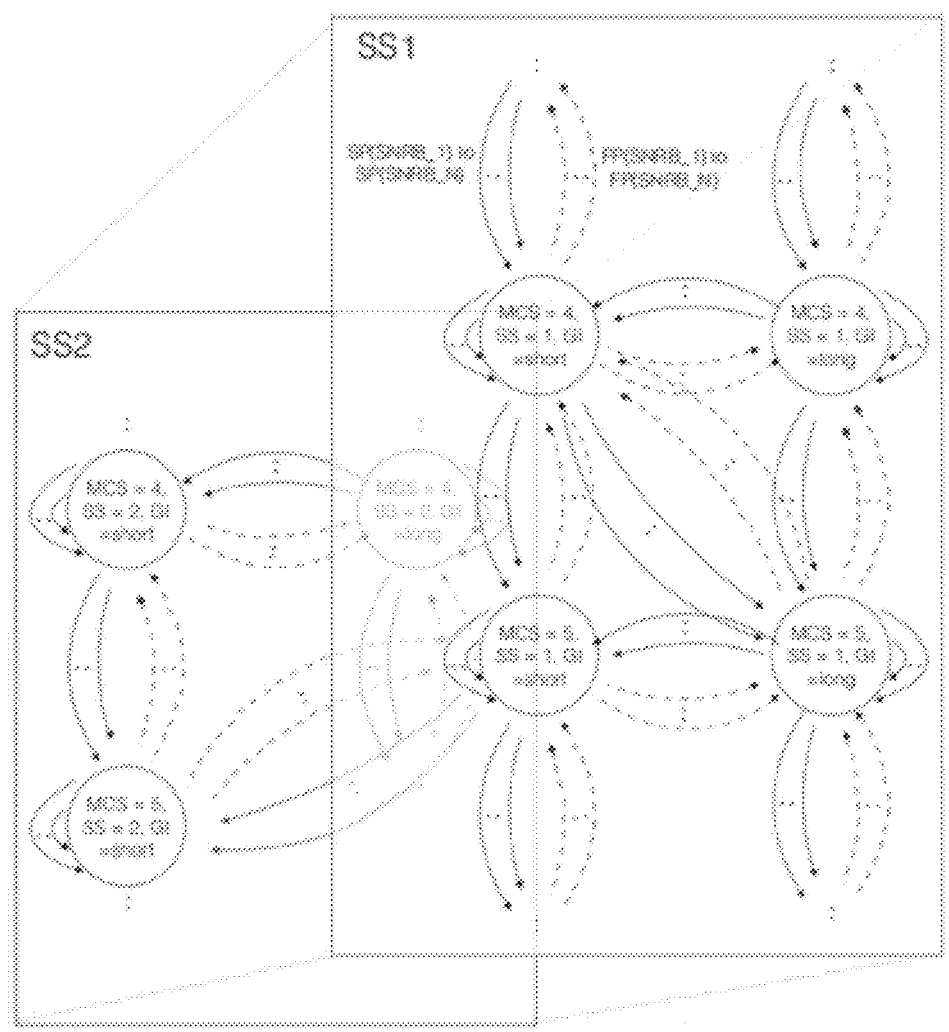
FIG. 7 depicts a multivariate fingerprint model according to one embodiment.

FIG. 7 depicts a multivariate fingerprint model 700 for one known client device according to one embodiment. The fingerprint model 700 is described in terms of a Markov chain. However, other models may be used instead of, or in addition to, a Markov chain.

The model 700 includes one or more state spaces SS1, SS2. Within each state space, each state, shown as a circle, represents a particular combination of values of the variables represented by the model 700. The variables shown in the model 700 include MCS index, number of spatial streams (SS), and guard interval (GI). In other embodiments, the variables may include other variables as well, or any combination of variables. Example variables include modulation scheme, coding scheme, number of spatial streams, guard interval, bandwidth, low density parity check coding scheme, space-time block coding scheme, and the like.

In the model 700, each edge represents a probability of packet reception success at a particular known client device (solid lines) or a probability of packet reception failure at a particular known client device (dotted lines). In state space SS1, the probabilities of transitions from one state to another are a function of signal-to-noise ratio (SNR). Every edge represents the packet reception success probability as a function of SNR bucket SP(SNRB) or the packet reception failure probability, also as a function of SNR bucket FP(SNRB). The model 700 may include one or more additional state spaces, such as state space SS2, where the edges in each state space represent packet reception success and failure probabilities as a function of a different channel feature. Example channel features include rank, frequency selectivity, client device mobility state, channel environment, channel center frequency, and the like.

In some embodiments, the model reflects the mobility state of the device. In such embodiments, the state transition probabilities represent a mobility estimate parameter such as an estimate of the client device being stationary or moving, the movement speed, the probability of moving, and the like.

In some embodiments, the model reflects the channel environment, for example such as 2G vs 5G, indoor vs outdoor, access point density, propagation, and the like.

In some embodiments, the model is a function of the transmit power from the access point.

In some embodiments, the model reflects access point capabilities. For example, different access point implementations could vary between one and eight receive chains. Some client devices are dual-band capable (i.e., 2G and 5G).

The client device or access point capability may differ between the two bands. Some access points have more receiver chains in 5G than 2G to reduce cost for a given average performance. In these cases, client device behavior could be modeled independently or jointly between the two bands for improved performance.

Some embodiments include an application at the client device for estimation of channel parameters and sharing the parameters for updating the fingerprint model.

Figure 8:
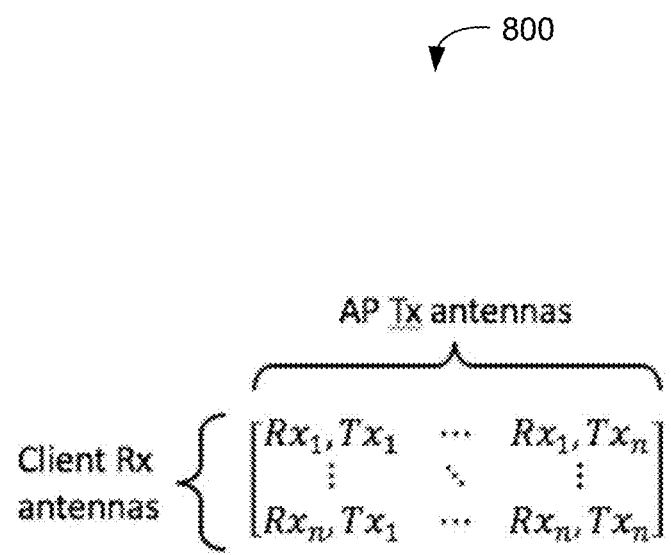
FIG. 8 shows an SNR matrix according to one embodiment.

The SNR of the signal received at a multi-antenna client device may differ for each antenna. In some embodiments, the model reflects the SNR of the received signal at the different antennas. In such embodiments, the model can include an SNR matrix such as the SNR matrix 800 shown in FIG. 8. In the SNR matrix 800 the rows represent the receive antennas at the client device, and the columns reflect the transmit antennas of the access point.

Figure 9:
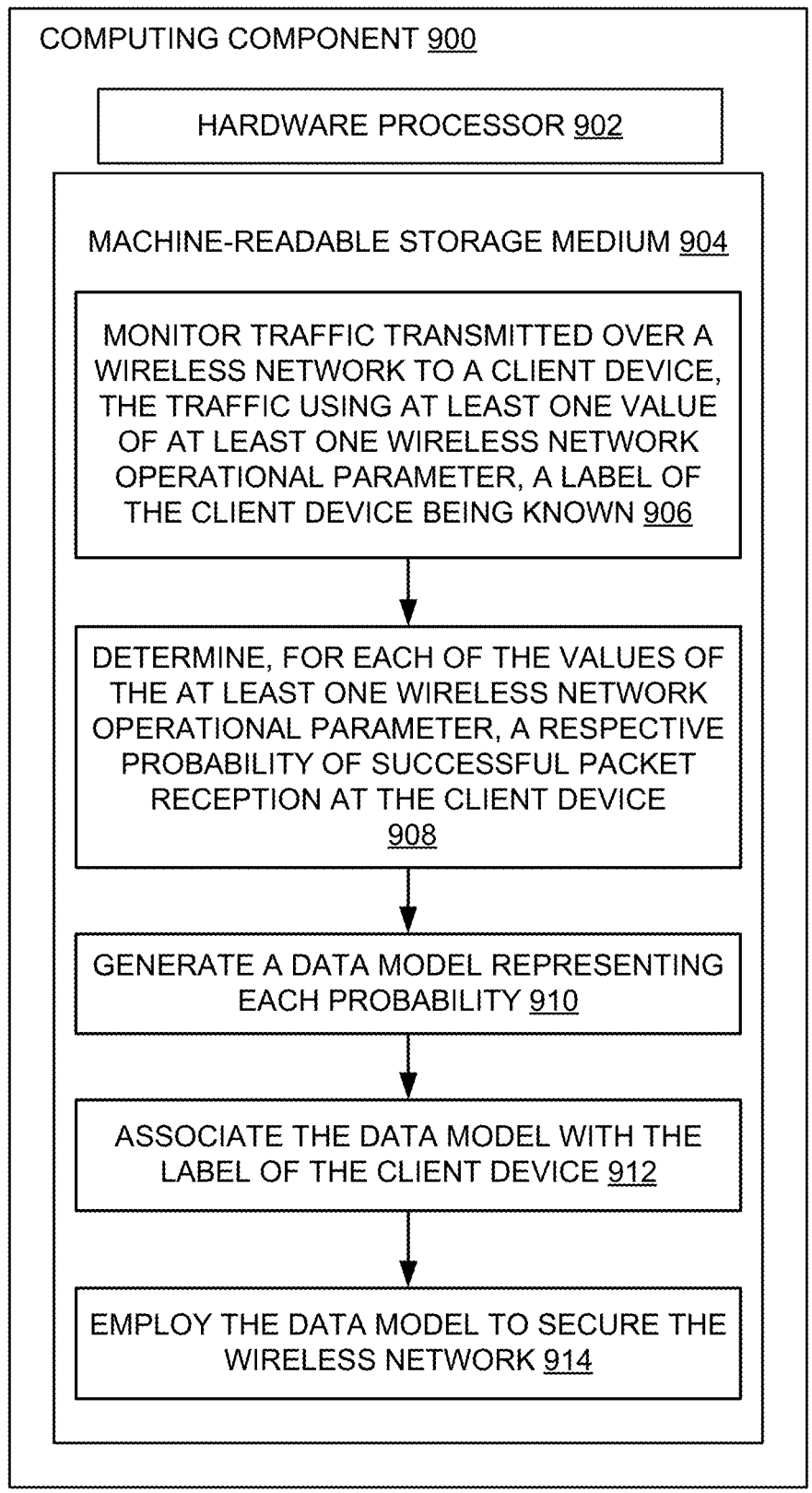
FIG. 9 is a block diagram of an example computing component or device for generating a client device fingerprint model in accordance with one embodiment.

FIG. 9 is a block diagram of an example computing component or device 900 for generating a client device fingerprint model in accordance with one embodiment. Computing component 900 may be, for example, a server computer, a controller, or any other similar computing component capable of processing data. In the example implementation of FIG. 9, the computing component 900 includes a hardware processor, 902, and machine-readable storage medium, 904.

Hardware processor 902 may be one or more central processing units (CPUs), semiconductor-based microprocessors, and/or other hardware devices suitable for retrieval and execution of instructions stored in machine-readable storage medium, 904. Hardware processor 902 may fetch, decode, and execute instructions, such as instructions 906-912, to control processes or operations for generating the client device fingerprint model. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 902 may be a non-transitory storage medium, where the term "non-transitory" does not encompass transitory propagating signals. As described in detail below, machine-readable storage medium 902 may be encoded with executable instructions, for example, instructions 906-912.

Hardware processor 902 may execute instruction 906 to monitor traffic transmitted over a wireless network to a client device 204, the traffic using at least one value of at least one wireless network operational parameter, a label of the client device 204 being known. The label includes one or more parameters that identify the device. Example parameters include make, model, operating system version, and the like.

Hardware processor 902 may execute instruction 908 to determine, for each of the values of the at least one wireless network operational parameter, a respective probability of successful packet reception at the client device 204. The use of packet reception probabilities is described above with reference to FIG. 7.

Hardware processor 902 may execute instruction 910 to generate a data model representing each probability. Models generations using packet reception probabilities is also described above with reference to FIG. 7.

Hardware processor 902 may execute instruction 912 to associate the data model with the label of the client device 204. Now the data model may be used to identify other instances of that client device on the wireless network.

Hardware processor 902 may execute instruction 914 to employ the data model to secure the wireless network. The data model may be used alone or with other data to identify devices that should not have access to the wireless network, for example devices that are spoofing other devices, and to deny those devices access to the wireless network. Consider an example where an unauthorized Samsung phone is spoofing an authorized iPhone using that iPhone's MAC address. The model may be used to identify the Samsung phone as being the wrong make or OS, and then to deny network access to the Samsung phone. This process is described in detail with reference to FIG. 10.

Figure 10A:
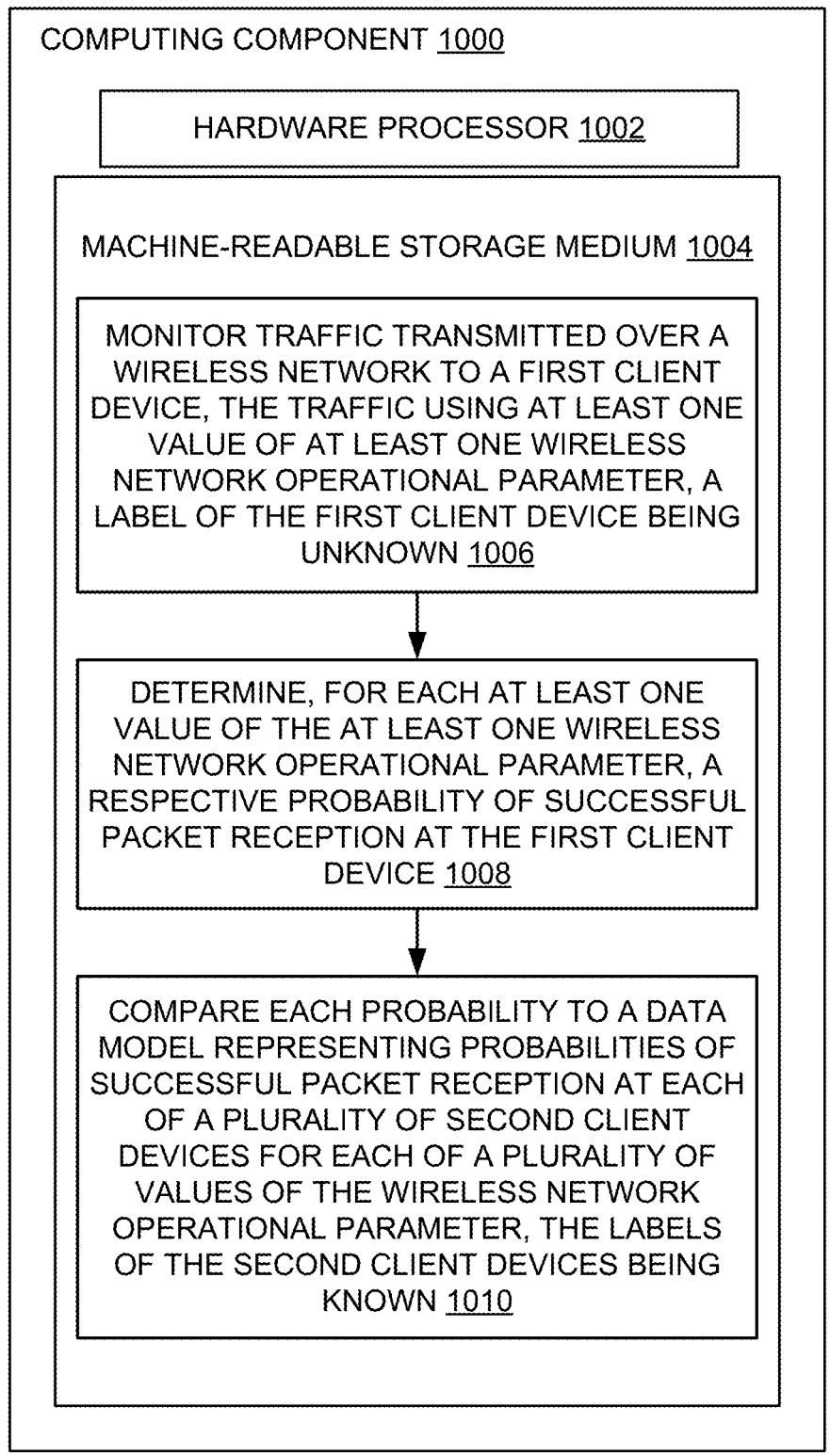
FIGS. 10a and 10b are a block diagram of an example computing component or device for identifying client devices using a client device fingerprint model in accordance with one embodiment.
Figure 10B:
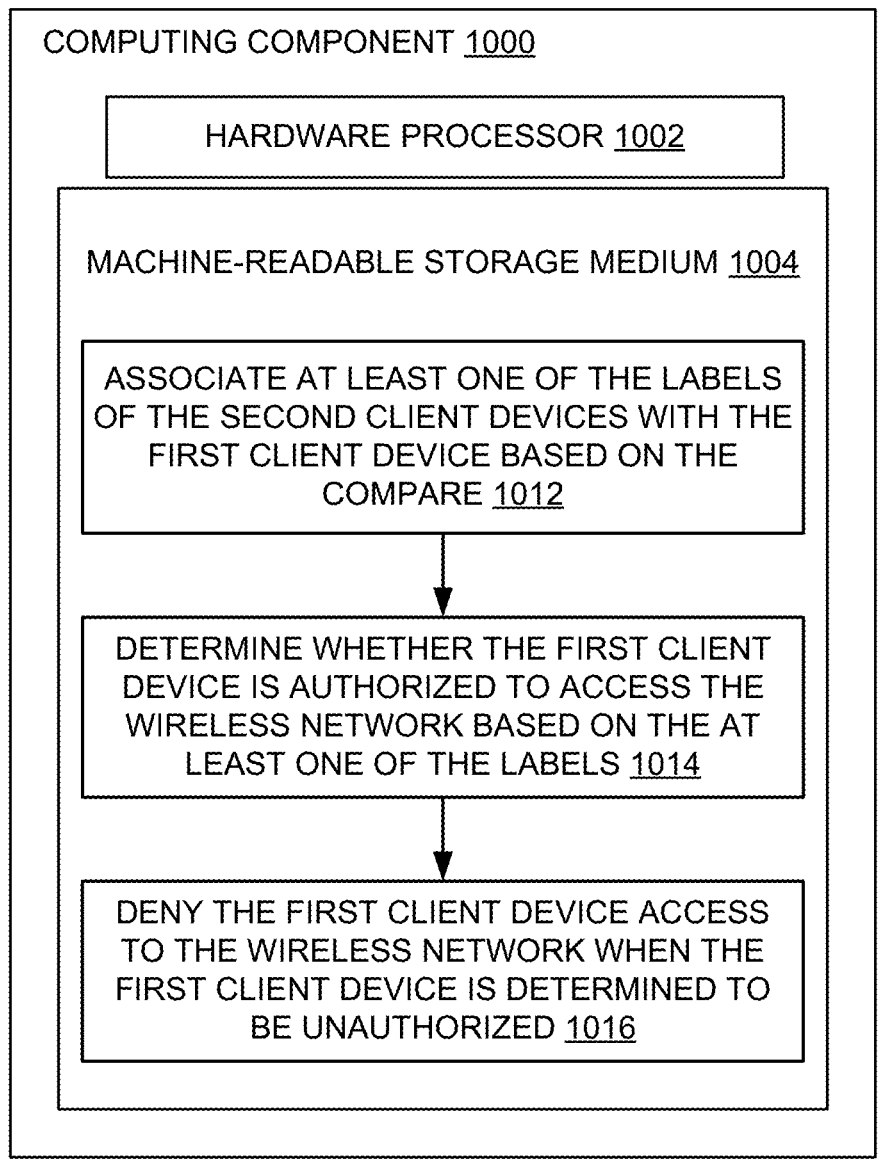

FIGS. 10a and 10b are a block diagram of an example computing component or device 1000 for identifying client devices 204 using a client device fingerprint model in accordance with one embodiment. Computing component 1000 may be, for example, a server computer, a controller, or any other similar computing component capable of processing data. In the example implementation of FIG. 10, the computing component 1000 includes a hardware processor, 1002, and machine-readable storage medium, 1004.

Hardware processor 1002 may be one or more central processing units (CPUs), semiconductor-based microprocessors, and/or other hardware devices suitable for retrieval and execution of instructions stored in machine-readable storage medium, 1004. Hardware processor 1002 may fetch, decode, and execute instructions, such as instructions 1006-1012, to control processes or operations for identifying client devices 204 using a client device fingerprint model. As an alternative or in addition to retrieving and executing instructions, hardware processor 1002 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1004, may be any electronic, magnetic, optical, or other physical storage device that contains or stores executable instructions. Thus, machine-readable storage medium 1004 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1002 may be a non-transitory storage medium, where the term "non-transitory" does not encompass transitory propagating signals. As described in detail below, machine-readable storage medium 1002 may be encoded with executable instructions, for example, instructions 1006-1012.

Hardware processor 1002 may execute instruction 1006 to monitor traffic transmitted over a wireless network to a first client device 204, the traffic using at least one value of at least one wireless network operational parameter, a label of the first client device being unknown.

Hardware processor 1002 may execute instruction 1008 to determine, for each at least one value of the at least one wireless network operational parameter, a respective probability of successful packet reception at the first client device 204. The use of packet reception probabilities is described above with reference to FIG. 7.

Hardware processor 1002 may execute instruction 1010 to compare each probability to a data model representing probabilities of successful packet reception at each of a plurality of second client devices 204 for each of a plurality of values of the wireless network operational parameter, the labels of the second client devices being known. That is, the collected data is used with the data model to identify the first client device 204.

Hardware processor 1002 may execute instruction 1012 to associate at least one of the labels of the second client devices 204 with the first client device 204 based on the compare. That is, the first client device 204 is identified.

Hardware processor 1002 may execute instruction 1014 to determine whether the first client device 204 is authorized to access the wireless network based on the label(s). For example if the first client device 204 has an authorized MAC address but is the wrong model of smartphone, the first client device 204 is not authorized.

Hardware processor 1002 may execute instruction 1012 to deny the first client device 204 access to the wireless network when the first client device is determined to be unauthorized. For example the system may terminate the connection with the device and add that device to a blacklist.

Figure 11:
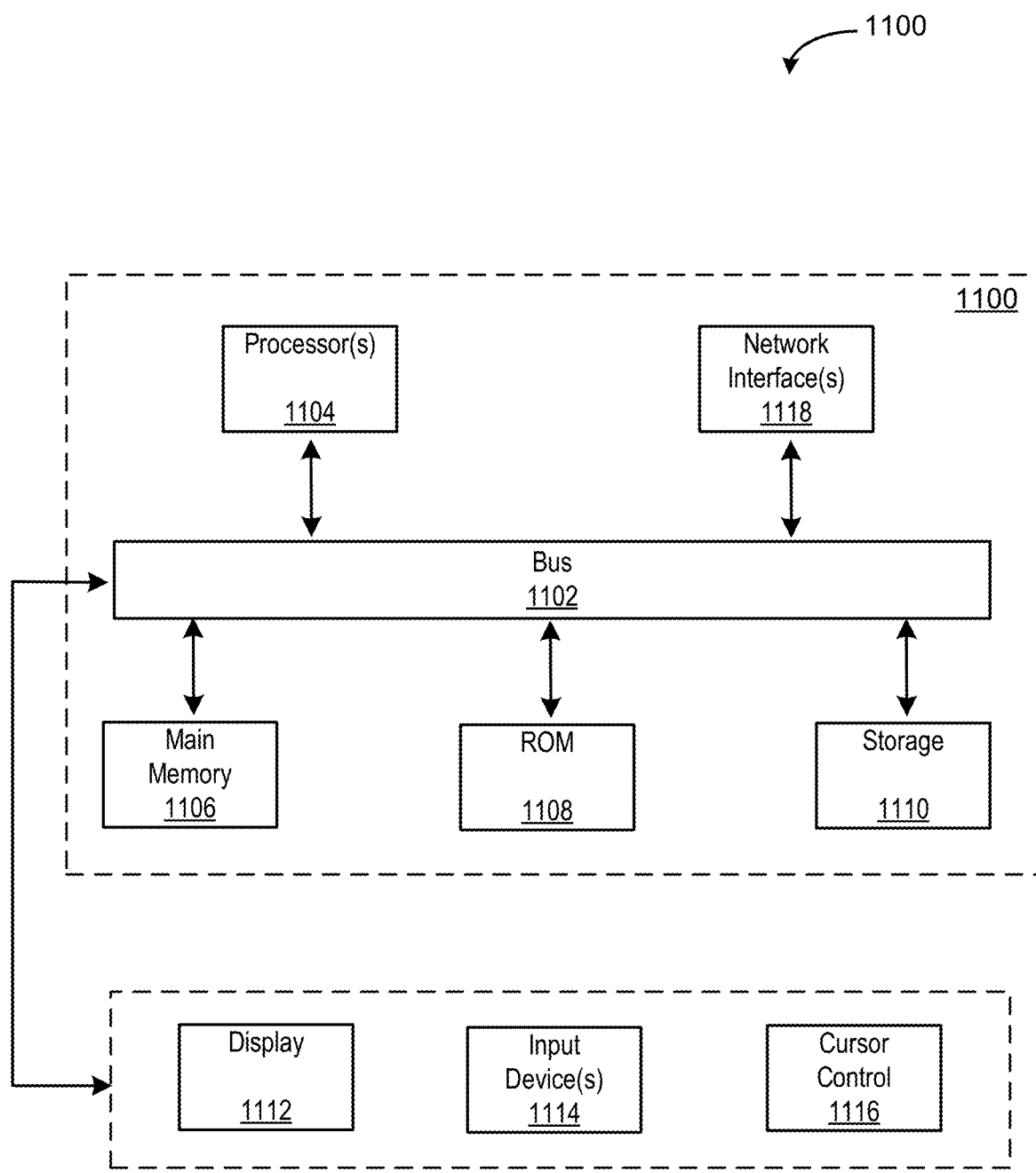
FIG. 11 depicts a block diagram of an example computer system in which various of the embodiments described herein may be implemented.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component of a monitoring device, the machine-readable storage medium comprising instructions to cause the hardware processor to:
   monitor traffic transmitted over a wireless network to a client device to identify at least one value of at least one wireless network operational parameter;
   a label of the client device being known;
   determine, for each of the values of the at least one wireless network operational parameter, a respective probability of successful packet reception at the client device;
   generate a data model representing each probability; and
   associate the data model with the label of the client device.

2. The non-transitory machine-readable storage medium of claim 1, wherein the at least one wireless network operational parameter comprises at least one of:
   a modulation scheme; and
   a coding scheme.

3. The non-transitory machine-readable storage medium of claim 1, wherein the at least one wireless network operational parameter comprises at least one of:
   a number of spatial streams;
   a guard interval;
   a bandwidth;
   a low density parity check coding scheme; and
   a space-time block coding scheme.

4. The non-transitory machine-readable storage medium of claim 1, wherein the data model represents each probability as a function of at least one of:
   a signal-to-noise matrix, the rows of the matrix representing client device antennas, and the columns of the matrix representing access point antennas;
   a signal-to-noise ratio; and
   a received signal strength indication.

5. The non-transitory machine-readable storage medium of claim 1, wherein the data model represents each probability as a function of at least one of:
   a rank; and
   a frequency selectivity.

6. The non-transitory machine-readable storage medium of claim 1, wherein the data model represents each probability as a function of at least one of:
   a client device mobility state; and
   a channel environment.
   a channel center frequency.

7. The non-transitory machine-readable storage medium of claim 1, wherein the instructions further cause the hardware processor to:
   employ the data model to secure the wireless network.

8. A non-transitory machine-readable storage medium encoded with instructions executable by a hardware processor of a computing component of an access point having a plurality of radio chains, the machine-readable storage medium comprising instructions to cause the hardware processor to:

monitor traffic transmitted over a wireless network to a first client device to identify at least one value of at least one wireless network operational parameter;
a label of the first client device being unknown;
determine, for each at least one value of the at least one wireless network operational parameter, a respective probability of successful packet reception at the first client device;
compare each probability to a data model representing probabilities of successful packet reception at each of a plurality of second client devices for each of a plurality of values of the wireless network operational parameter;
the labels of the second client devices being known; and
associate at least one of the labels of the second client devices with the first client device based on the compare.

9. The non-transitory machine-readable storage medium of claim 8, wherein the at least one wireless network operational parameter comprises at least one of:
a modulation scheme; and
a coding scheme.

10. The non-transitory machine-readable storage medium of claim 8, wherein the at least one wireless network operational parameter comprises at least one of:
a number of spatial streams;
a guard interval;
a bandwidth;
a low density parity check coding scheme; and
a space-time block coding scheme.

11. The non-transitory machine-readable storage medium of claim 8, wherein the data model represents each probability as a function of at least one of:
a signal-to-noise matrix, the rows of the matrix representing client device antennas, and the columns of the matrix representing access point antennas;
a signal-to-noise ratio; and
a received signal strength indication.

12. The non-transitory machine-readable storage medium of claim 8, wherein the data model represents each probability as a function of at least one of:
a rank; and
a frequency selectivity.

13. The non-transitory machine-readable storage medium of claim 8, wherein the data model represents each probability as a function of at least one of:
a client device mobility state;
a channel environment; and
a channel center frequency.

14. The non-transitory machine-readable storage medium of claim 8, wherein the instructions further cause the hardware processor to:
employ the data model to secure the wireless network.

15. A system comprising:
a hardware processor; and
a non-transitory machine-readable storage medium encoded with instructions executable by the hardware processor to:
monitor traffic transmitted over a wireless network to a first client device to identify at least one value of at least one wireless network operational parameter;
a label of the first client device being unknown;
determine, for each at least one value of the at least one wireless network operational parameter, a respective probability of successful packet reception at the first client device;
compare each probability to a data model representing probabilities of successful packet reception at each of a plurality of second client devices for each of a plurality of values of the wireless network operational parameter;
the labels of the second client devices being known; and
associate at least one of the labels of the second client devices with the first client device based on the compare.

16. The system of claim 15, wherein the at least one wireless network operational parameter comprises at least one of:
a number of spatial streams;
a guard interval;
a bandwidth;
a low density parity check coding scheme; and
a space-time block coding scheme.

17. The system of claim 15, wherein the data model represents each probability as a function of at least one of:
a signal-to-noise matrix, the rows of the matrix representing client device antennas, and the columns of the matrix representing access point antennas;
a signal-to-noise ratio; and
a received signal strength indication.

18. The system of claim 15, wherein the data model represents each probability as a function of at least one of:
a rank; and
a frequency selectivity.

19. The system of claim 15, wherein the data model represents each probability as a function of at least one of:
a client device mobility state;
a channel environment; and
a channel center frequency.

20. The system of claim 15, wherein the instructions are executable by the hardware processor to:
determine whether the first client device is authorized to access the wireless network based on the at least one of the labels; and
deny the first client access to the wireless network when the first client device is determined to be unauthorized.

* * * * *